United States Patent [19]
Dickson et al.

[11] Patent Number: 5,526,228
[45] Date of Patent: Jun. 11, 1996

[54] COMPUTER SYSTEM UNIT WITH ACOUSTIC DAMPENING COOLING FAN SHROUD PANEL

[75] Inventors: Russell E. Dickson; John T. Gullicksrud; David W. Hill; Tim K. Murphy; Michael D. O'Connell; Mark M. Thornton, all of Rochester, Minn.

[73] Assignee: International Business Machines Corporation, Armonk, N.Y.

[21] Appl. No.: 298,631

[22] Filed: Aug. 31, 1994

[51] Int. Cl.⁶ .................................................. H05K 7/20
[52] U.S. Cl. ............................................................ 361/695
[58] Field of Search ............................... 361/688, 690, 361/692, 694–697, 724

[56] References Cited

U.S. PATENT DOCUMENTS

| | | |
|---|---|---|
| 4,748,540 | 5/1988 | Henneberg et al. |
| 5,018,052 | 5/1991 | Ammon et al. |
| 5,027,254 | 6/1991 | Curfits et al. ............... 361/694 |
| 5,027,257 | 6/1991 | Lockwood et al. ............ 361/692 |
| 5,142,442 | 8/1992 | Daniels et al. |

FOREIGN PATENT DOCUMENTS

| | | |
|---|---|---|
| 5-21977 | 1/1993 | Japan. |

OTHER PUBLICATIONS

IBM Tech. Discl. Bulletin, "Low Noise Air Moving Chamber For An Electronic Apparatus Enclosure", Desilva et al, vol. 20, No. 4, Sep. 1977, p. 1336.

*Primary Examiner*—Gregory D. Thompson
*Attorney, Agent, or Firm*—Andrew J. Dillon

[57] ABSTRACT

A computer system unit which includes an acoustic dampening cooling fan shroud panel mounted on a rear surface thereof. The computer system unit is generally rectangular, encloses an electronic component package and includes a front panel and a pair of generally parallel side panels. An intermediate rear panel, generally parallel to the front panel, mounts one or more cooling fans which draw air through the generally rectangular unit. A cooling fan shroud panel which includes an acoustic noise reduction lining is then mounted to the intermediate rear panel. The cooling fan shroud panel includes an aperture for ventilation which is displaced from the mounting position of the cooling fans such that acoustic noise resultant from cooling fan operation is minimized. The aperture within the cooling fan shroud panel extends into at least one surface thereof which is not parallel to either the side panel or the intermediate rear panel wherein ventilation is substantially unobstructed by adjacent vertical surfaces.

16 Claims, 3 Drawing Sheets

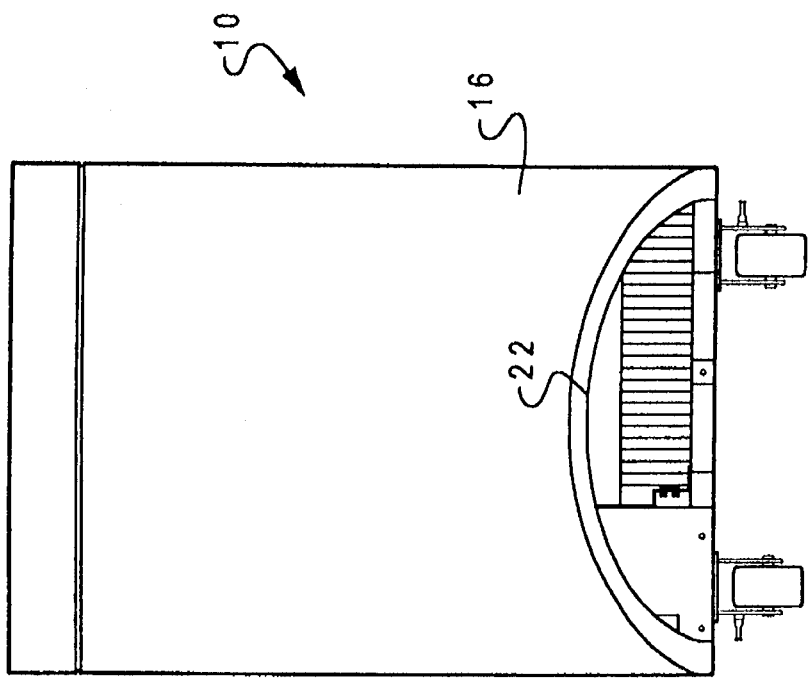
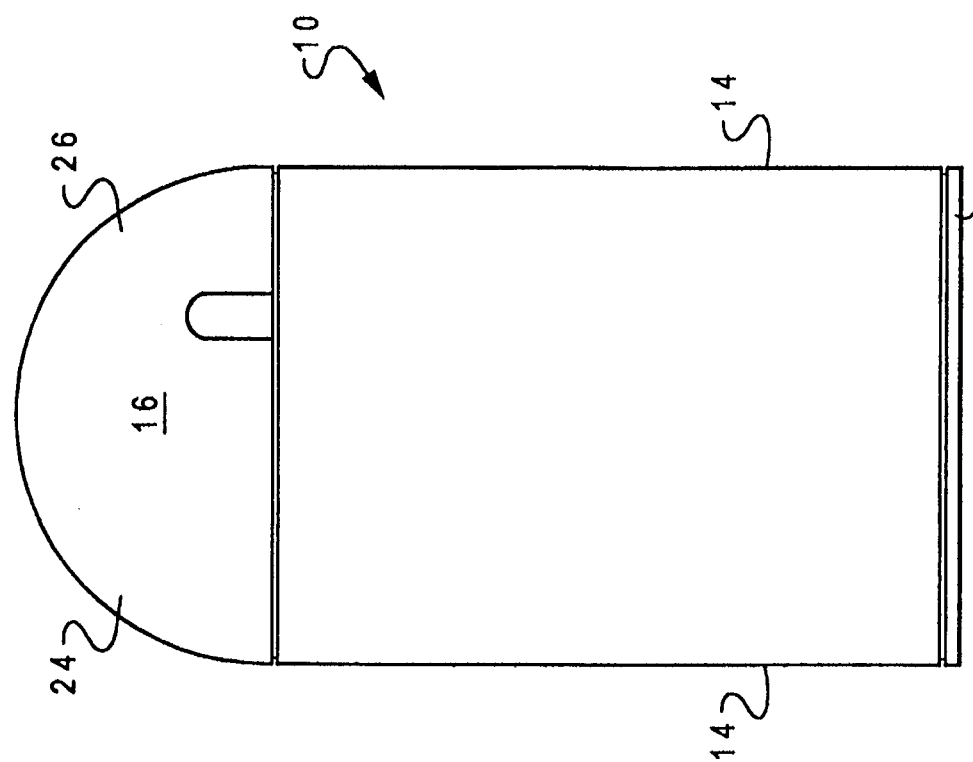
Fig. 4
Fig. 3

COMPUTER SYSTEM UNIT WITH ACOUSTIC DAMPENING COOLING FAN SHROUD PANEL

BACKGROUND OF THE INVENTION

1. Technical Field

The present invention relates in general to housings for enclosing computer systems and in particular to cooling fan shroud panels for use with such housings. Still more particularly the present invention relates to a computer system unit which includes an acoustic noise reduction lining within a cooling fan shroud panel.

2. Description of the Related Art

Modern computer systems are becoming increasingly complex and utilize increased amounts of electrical energy. As this complexity increases, more components are placed within the computer systems including peripheral devices such as disk drives, etc. which require additional electrical power and which generate more and more heat.

With the advent of the increased heat developed by such systems, modern computer systems require increased ventilation to move cooling air through the unit. Additionally, such systems are becoming increasingly less tolerant to overheating conditions, particularly if expensive disk drive units are installed. Thus, a failure to provide adequate ventilation through a modern computer system may increase the probability of computer failure due to overheating and may result in damage to the electronics and/or peripheral units. Due to the great expense of these units and the concomitant loss in processing time associated with such failures it is desirable that adequate ventilation be maintained for such systems.

Additionally, as distributed computing systems utilizing multiple units are becoming more common, the modern computer system is being installed in office environments without regard to minimum clearances required to provide adequate ventilation. Additionally, the noise associated with the ventilation of such powerful computing systems represents an additional problem which must be overcome.

It should therefore be apparent that a need exists for a computer system unit which can be adequately ventilated despite the presence of adjacent vertical surfaces and which minimizes the amount of acoustic noise emitted into the office environment.

SUMMARY OF THE INVENTION

It is therefore one object of the present invention to provide an improved housing for enclosing a computer system.

It is another object of the present invention to provide an improved cooling fan shroud panel for utilization with a computer system housing.

It is yet another object of the present invention to provide a computer system unit which includes an acoustic noise reduction lining within a cooling fan shroud panel.

The foregoing objects are achieved as is now described. A computer system unit is provided which includes an acoustic dampening cooling fan shroud panel which is mounted on a rear surface thereof. The computer system unit is generally rectangular, encloses an electronic component package and includes a front panel and a pair of generally parallel side panels. An intermediate rear panel, generally parallel to the front panel, mounts one or more cooling fans which draw air through the generally rectangular unit. A cooling fan shroud panel which includes an acoustic noise reduction lining is then mounted to the intermediate rear panel. The cooling fan shroud panel includes an aperture for ventilation which is displaced from the mounting position of the cooling fans such that acoustic noise resultant from cooling fan operation is minimized. The aperture within the cooling fan shroud panel extends into at least one surface thereof which is not parallel to either the side panel or the intermediate rear panel wherein ventilation is substantially unobstructed by adjacent vertical surfaces.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a top view of the computer system unit of FIG. 1;

FIG. 4 is a rear view of the computer system unit of FIG. 1;

DETAILED DESCRIPTION OF PREFERRED EMBODIMENT

Figure 1:
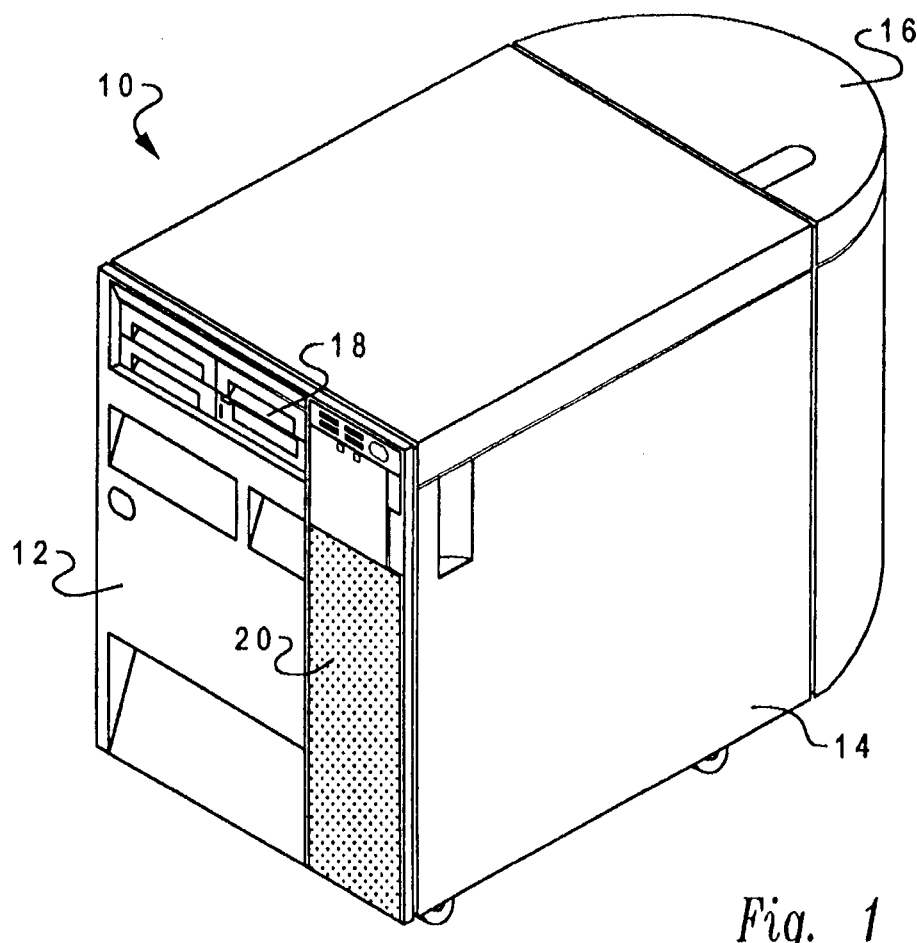
FIG. 1 is a perspective view of a computer system unit incorporating the acoustic dampening cooling fan shroud panel of the present invention.

With reference now to the figures and in particular with reference to FIG. 1, there is depicted a perspective view of a computer system unit 10 which incorporates the acoustic dampening cooling fan shroud panel of the present invention. As illustrated, computer system unit 10 preferably includes a front panel 12 and a pair of generally parallel side panels 14, only one of which is illustrated in FIG. 1. A cooling fan shroud panel 16 is also provided and mounted at the rear of computer system unit 10.

Computer system unit 10 is preferably a modern computer system such as the International Business Machines Corporation Application System AS/400 or a so-called "personal computer" system such as the International Business Machines Corporation PS/2. As is common in such computer systems, front panel 12 preferably includes one or more direct access storage devices which are mounted within a bezel, such as bezel 18. Additionally, a ventilation grill 20 may also be provided which permits cooling air to be drawn into computer system unit 10 to cool the electronic components mounted therein.

Figure 2:
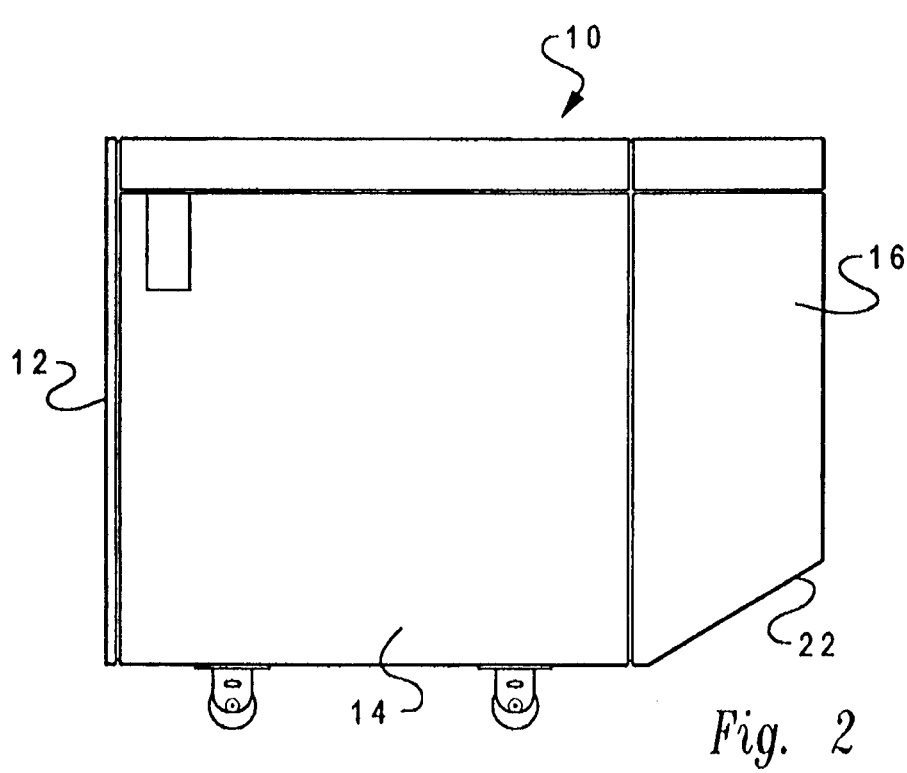
FIG. 2 is a side view of the computer system unit of FIG. 1.

Referring now to FIG. 2, there is depicted a side view of computer system unit 10 of FIG. 1. As illustrated, cooling fan shroud panel 16, which is mounted to rear surface of computer system unit 10 preferably includes a tapered aperture 22 at the bottom thereof, which in a manner which will be explained in greater detail herein, provides for adequate ventilation of flow while minimizing the acoustic noise which results from cooling fan operation.

With reference now to FIG. 3, there is depicted a top view of computer system unit 10 of FIG. 1, which illustrates an important feature of the present invention. As depicted, cooling fan shroud panel 16 is preferably cylindrical in shape and includes curvilinear surfaces 24 and 26. In a manner which will be explained in greater detail herein, the provision of curvilinear surfaces 24 and 26, which are not parallel to generally parallel side panels 14 or front panel 12 provide improved ventilation. In this manner, as will be illustrated in more detail with respect to FIG. 4, ventilation through cooling fan shroud panel 16 will not be obstructed by the presence of a substantially vertical surface adjacent to computer system unit 10. Of course, those skilled in the art will appreciate that cooling fan shroud panel 16 may also be formed as an elongate oval shape or alternately as a triangular shape, so long as surfaces are provided which are not parallel to the sides or rear of computer system unit 10, prohibiting the obstruction of ventilation by the presence of a substantially vertical adjacent surface such as a wall, desk or another computer system unit.

Referring now to FIG. 4, there is depicted a rear view of computer system unit 10 which illustrates the shape of ventilation aperture 22. As illustrated, ventilation aperture 22 is an arcuate slot which extends into curvilinear surfaces 24 and 26 (see FIG. 3) and thus provides an aperture for the egress of ventilating air despite the presence of an adjacent substantially vertical surface along side of or behind computer system unit 10.

Figure 5:
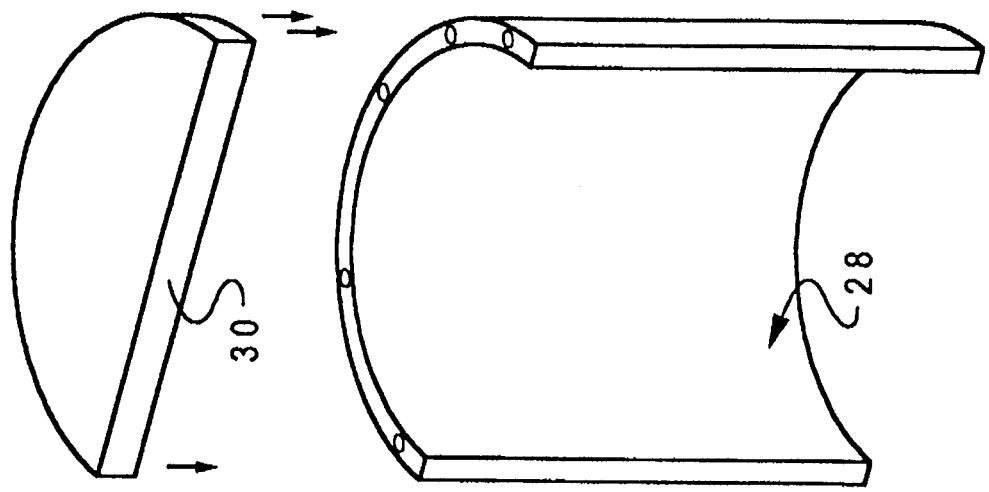
FIG. 5 is an exploded view of the acoustic foam lining of the cooling fan shroud panel of the present invention.

With reference now to FIG. 5, there is depicted an exploded view of an acoustic foam lining which is utilized within cooling fan shroud panel 16 of the present invention. As depicted, the acoustic foam lining includes a side acoustic foam panel 28 and a top acoustic foam panel 30. When assembled in the manner depicted within FIG. 5 within cooling fan shroud panel 16, the noise generated by the operation of cooling fans will be greatly diminished.

Figure 6:
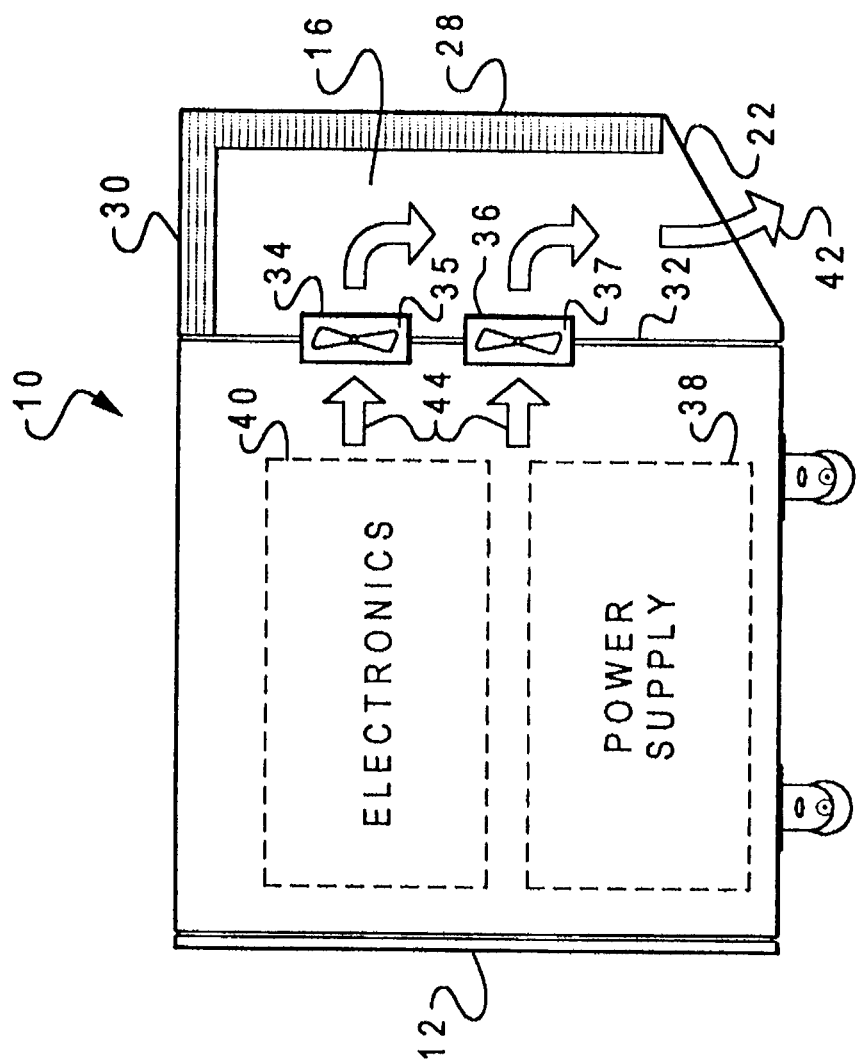
FIG. 6 is a sectional, partially schematic view of the computer system unit of FIG. 1.

Finally, referring to FIG. 6, there is depicted a sectional, partially schematic view of computer system unit 10 of the present invention. As depicted, computer system unit 10 preferably includes a power supply 38 and electronic component package 40 mounted therein. An intermediate rear panel 32 is depicted at the rear of computer system unit 10 which is substantially parallel to front panel 12. A pair of cooling fans 34 and 36 are also illustrated and mounted within two fan mounting apertures 35 and 37 within intermediate rear panel 32.

Next, as illustrated within FIG. 6, cooling fan shroud panel 16 is mounted to intermediate rear panel 32 with side acoustic foam panel 28 and top acoustic foam panel 30 mounted therein. As depicted within FIG. 6, ventilation aperture 22 is disposed at the bottom of cooling fan shroud panel 16 and extends into curvilinear surfaces 24 and 26 (see FIG. 3) such that ventilation air drawn through computer system unit 10 by cooling fans 34 and 36 will be drawn in the direction indicated at reference numerals 44 and out through ventilation aperture 22, as indicated at reference numeral 42.

As should be apparent to those skilled in the art upon reference to this disclosure by providing one or more cooling fans mounted within associated fan mounting apertures within intermediate rear panel 32 cooling air may be drawn through computer system unit 10 through bezel 18 or ventilation grill 20 in order to cool power supply 38 and electronic component package 40. The ventilation air is then drawn into cooling an shroud panel 16 and downward, exiting ventilation aperture 22. As ventilation aperture 22 is displaced some distance from the mounting location of cooling fans 34 and 36, the amount of acoustic noise generated within the environment of computer system unit 10 by the operation of cooling fans 34 and 36 will be minimized. In this manner, adequate ventilation may be provided for computer system unit 10 which will not be obstructed by the presence of adjacent vertical surfaces along side of or behind computer system unit 10 while minimizing the amount of acoustic noise generated by the operation of the cooling fans.

While the invention has been particularly shown and described with reference to a preferred embodiment, it will be understood by those skilled in the art that various changes in form and detail may be made therein without departing from the spirit and scope of the invention.

We claim:

1. A computer system unit comprising:

a generally rectangular enclosure for containing components of a computer system, said generally rectangular enclosure including a front panel, a rear panel and two generally parallel side panels;

at least one cooling fan for passing air through said generally rectangular enclosure via at least a fan mounting aperture within a selected one of said panels; and a cooling fan shroud panel affixed to said selected one of said panels for substantially enclosing said fan mounting aperture, said cooling fan shroud panel including an acoustic noise reduction lining and a second aperture therein displaced from said fan mounting aperture within said selected one of said panels wherein air may be drawn through said generally rectangular enclosure while minimizing acoustic noise resultant from operation of said at least one cooling fan.

2. The computer system unit according to claim 1, wherein said at least one cooling fan is mounted within said fan mounting aperture within said rear panel.

3. The computer system unit according to claim 2, wherein said cooling fan shroud panel includes at least one surface which is not parallel to said two generally parallel side panels and said rear panel and wherein said second aperture is located at least partially within said at least one surface wherein a substantially unobstructed clearance exists between said second aperture and any adjacent substantially vertical surface to allow adequate ventilation.

4. The computer system unit according to claim 1, wherein said second aperture comprises a generally arcuate segment removed from a bottom portion of said cooling fan shroud panel.

5. The computer system unit according to claim 1, wherein said acoustic noise reduction lining comprises a lining of acoustic foam.

6. The computer system unit according to claim 1, wherein said cooling fan shroud panel is generally cylindrical in shape.

7. The computer system unit according to claim 6, wherein said second aperture comprises a generally arcuate segment removed from a bottom portion of generally cylindrical cooling fan shroud panel.

8. The computer system unit according to claim 2, wherein said rear panel includes two vertically displaced cooling fans mounted in vertical alignment for drawing air through said generally rectangular enclosure.

9. A computer system comprising:

an electronic component package;

a generally rectangular enclosure for enclosing said electronic component package, said generally rectangular enclosure including a front panel, a rear panel and two generally parallel side panels;

at least one cooling fan for passing air through said generally rectangular enclosure via a fan mounting aperture within a selected one of said panels; and a cooling fan shroud panel affixed to said selected one of said panels for substantially enclosing said fan mounting aperture, said cooling fan shroud panel including an acoustic noise reduction lining and a second aperture therein displaced from said fan mounting aperture within said selected one of said panels wherein air may be drawn through said generally rectangular enclosure while minimizing acoustic noise resultant from operation of said at least one cooling fan.

10. The computer system according to claim 9, wherein said at least one cooling fan is mounted within said fan mounting aperture within said rear panel.

11. A computer system according to claim 10, wherein said cooling fan shroud panel includes at least one surface which is not parallel to said two generally parallel side panels and said rear panel and wherein said second aperture is located at least partially within said at least one surface wherein a substantially unobstructed clearance exists between said second aperture and any adjacent substantially vertical surface to allow adequate ventilation.

12. A computer system according to claim 9, wherein said second aperture comprises a generally arcuate segment removed from a bottom portion of said cooling fan shroud panel.

13. A computer system according to claim 9, wherein said acoustic noise reduction lining comprises a lining of acoustic foam.

14. A computer system according to claim 9, wherein said cooling fan shroud panel is generally cylindrical in shape.

15. A computer system according to claim 14, wherein said second aperture comprises a generally arcuate segment removed from a bottom portion of generally cylindrical cooling fan shroud panel.

16. A computer system unit according to claim 10, wherein said rear panel includes two vertically displaced cooling fans mounted in vertical alignment for drawing air through said generally rectangular enclosure.

* * * * *